United States Patent
Contreras

(10) Patent No.: US 8,724,249 B2
(45) Date of Patent: May 13, 2014

(54) DISK DRIVE WITH MULTIPLEXED READ SIGNAL AND FLY-HEIGHT SIGNAL FOR FLY-HEIGHT MONITORING DURING WRITING

(75) Inventor: John Thomas Contreras, Palo Alto, CA (US)

(73) Assignee: HGST Netherlands B.V., Amsterdam (NL)

( * ) Notice: Subject to any disclaimer, the term of this patent is extended or adjusted under 35 U.S.C. 154(b) by 196 days.

(21) Appl. No.: 13/331,688

(22) Filed: Dec. 20, 2011

(65) Prior Publication Data

US 2013/0155538 A1 Jun. 20, 2013

(51) Int. Cl.
G11B 5/60 (2006.01)
(52) U.S. Cl.
USPC .......................................... 360/75; 360/234.5
(58) Field of Classification Search
USPC ............. 360/39, 46, 55, 75, 67, 71, 220, 224, 360/230, 234.3, 234.5
See application file for complete search history.

(56) References Cited

U.S. PATENT DOCUMENTS

| | | | |
|---|---|---|---|
| 5,182,682 A * | 1/1993 | Weispfenning et al. ... | 360/77.08 |
| 5,455,730 A | 10/1995 | Dovek et al. | |
| 5,777,815 A * | 7/1998 | Kasiraj et al. ................... | 360/75 |
| 5,991,113 A | 11/1999 | Meyer et al. | |
| 6,525,897 B2 * | 2/2003 | Despain et al. ............ | 360/77.06 |
| 7,023,647 B2 | 4/2006 | Bloodworth et al. | |
| 7,095,587 B2 | 8/2006 | Kurita et al. | |
| 7,486,457 B2 | 2/2009 | Jen et al. | |
| 7,495,856 B2 | 2/2009 | Payne et al. | |
| 7,551,384 B1 * | 6/2009 | McFadyen et al. ............. | 360/67 |
| 7,719,786 B1 | 5/2010 | Baumgart et al. | |
| 7,916,420 B1 * | 3/2011 | McFadyen et al. ............. | 360/75 |
| 2005/0201001 A1 * | 9/2005 | Conteras et al. ................ | 360/75 |
| 2006/0158768 A1 | 7/2006 | Tanabe | |
| 2007/0058280 A1 | 3/2007 | Wada et al. | |
| 2008/0266693 A1 * | 10/2008 | Bliss et al. ...................... | 360/32 |
| 2010/0073799 A1 * | 3/2010 | Ionescu .......................... | 360/46 |
| 2010/0142096 A1 | 6/2010 | Contreras et al. | |
| 2011/0134557 A1 | 6/2011 | Baumgart et al. | |
| 2011/0242691 A1 * | 10/2011 | Burger et al. .................... | 360/31 |
| 2012/0212851 A1 * | 8/2012 | Goldberg et al. ............... | 360/46 |
| 2012/0250484 A1 * | 10/2012 | Polley et al. ............... | 369/53.39 |

* cited by examiner

Primary Examiner — Thomas Alunkal
(74) Attorney, Agent, or Firm — Thomas R. Berthold

(57) ABSTRACT

A magnetic recording disk drive has a fly-height sensor on the slider that supports the read/write head. The head-disk spacing signal from the fly-height sensor utilizes the existing read path between the arm electronics (AE) module and the channel electronics module. A variable gain amplifier (VGA) on the AE module receives as one input the head-disk spacing signal and as the other input an emulated read signal. The output of the VGA is thus an oscillatory signal that emulates the read signal but whose amplitude varies as the head-disk spacing varies. A multiplexer (MUX) on the AE module multiplexes the amplified read signal from the read amplifier with the VGA oscillatory output signal on the read path back to the channel electronics module.

15 Claims, 5 Drawing Sheets

DISK DRIVE WITH MULTIPLEXED READ SIGNAL AND FLY-HEIGHT SIGNAL FOR FLY-HEIGHT MONITORING DURING WRITING

BACKGROUND OF THE INVENTION

1. Field of the Invention

This invention relates to magnetic recording disk drives, and more particularly to disk drives that have a fly-height sensor for sensing head-disk spacing, including head-disk contact.

2. Description of the Related Art

Magnetic recording hard disk drives use a read/write transducer or head mounted on a head carrier for reading and/or writing data to the disk. The head carrier is typically an air-bearing slider attached to an actuator arm by a suspension and positioned very close to the disk surface by the suspension. There are typically a stack of disks in the disk drive with a slider-suspension assembly associated with each disk surface in the stack.

The separation or spacing between the head and the disk surface is called the fly-height. The slider has a disk-facing air-bearing surface (ABS) that causes the slider to ride on a cushion or bearing of air generated by rotation of the disk. The slider is attached to a flexure on the suspension and the suspension includes a load beam that applies a load force to the slider to counteract the air-bearing force while permitting the slider to "pitch" and "roll". The flying dynamics of the slider and thus the fly-height are influenced by factors such as the rotation speed of the disk, the aerodynamic shape of the slider's ABS, the load force applied to the slider by the suspension, and the pitch and roll torques applied to the slider by the suspension.

Disk drives may use a fly-height sensor, such as an electrical resistor near the ABS, to monitor the fly-height, and a fly-height actuator for changing the fly-height in response to the output of the fly-height sensor. One type of fly-height actuator is a thermal actuator with an electrically-resistive heater located on the slider near the head. When current is applied to the heater the heater expands and causes the head to expand and thus move closer to the disk surface. The fly-height can thus be monitored and actively controlled during writing. Additionally, writing can be inhibited if the fly-height sensor detects head-disk contact or near contact.

However, the use of a fly-height sensor requires a separate electrical lead on the flex cable that connects the electronics module located on the actuator arm, called the arm electronics (AE) module, and the channel electronics module located on a printed circuit card fixed relative to the disk drive housing or base. This separate lead also requires additional input/output (I/O) pins on these two modules.

Thus what is needed is disk drive with a fly-height sensor that does not require a separate lead on the flex cable and the associated increased number of I/O pins.

SUMMARY OF THE INVENTION

This invention relates to a disk drive with a fly-height sensor on the slider that generates a head-disk spacing signal. The head-disk spacing signal utilizes the existing read path between the AE module and the channel electronics module and thus does not require a separate lead on the flex cable and the associated increased number of I/O pins. In a first embodiment a variable gain amplifier (VGA) on the AE module receives as one input the head-disk spacing signal and as the other input an emulated read signal from an oscillator. The oscillatory signal from the oscillator preferably has a frequency close to that of the read signal from the read amplifier. The output of the VGA is thus an oscillatory signal that emulates the read signal but whose amplitude varies as the head-disk spacing varies. A multiplexer (MUX) on the AE module multiplexes the amplified read signal from the read amplifier with the VGA oscillatory output signal on the read path back to the channel electronics module. The MUX thus sends the amplified read signal during read mode and the emulated read signal representative of the head-disk spacing signal during write mode.

In another embodiment the write signal from the write electronics is the source of the oscillatory input to the VGA. A buffer block functions as an isolating tap off of the write signal so there is no loading of the write signal to write driver. The write signal frequency may be reduced by an optional frequency divider (FD) between the buffer block and the VGA. The buffer block coupled to the write signal and the optional FD function as circuitry that emulates the read signal, like the oscillator in the first embodiment.

The disk drive may include a fly-height actuator and a fly-height controller responsive the head-disk spacing signal, which enable the head-disk spacing to be actively controlled during writing. The disk drive may also use the head-disk spacing signal to indicate head-disk contacts or near-contacts, so that writing can be inhibited.

For a fuller understanding of the nature and advantages of the invention, reference should be made to the following detailed description taken together with the accompanying figures.

DETAILED DESCRIPTION OF THE INVENTION

Figure 1:
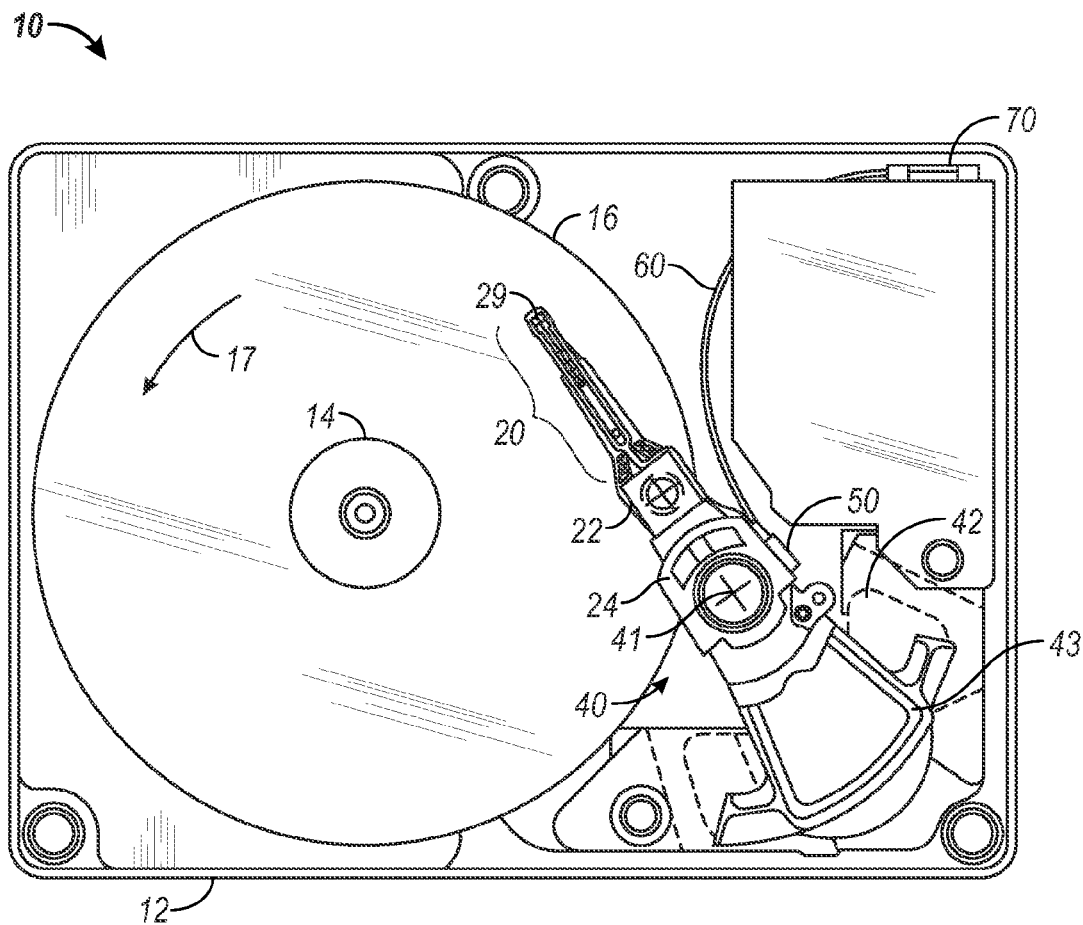
FIG. 1 is a schematic block diagram of a conventional magnetic recording disk drive of the type usable with this invention.

FIG. 1 is a top plan view of a head/disk assembly (HDA) of a hard disk drive 10. The disk drive 10 includes a rigid base 12 supporting a spindle 14 that supports a stack of disks, including top disk 16. The spindle 14 is rotated by a spindle motor (not shown) for rotating the disks in the direction shown by curved arrow 17. The hard disk drive 10 has at least one load beam assembly 20 having an integrated lead suspension (ILS) with an array of electrically conductive interconnect traces or lines that connect to a read/write head (not shown) on an air-bearing slider 29. The read/write head includes a magnetoresistive (MR) read head and an inductive write head. The load beam assembly 20 includes a suspension portion that allows the slider 29 to "pitch" and "roll" with its air-bearing surface (ABS) supported above but in close proximity to the surface of rotating disk 16. The load beam assemblies 20 are attached to rigid arms 22 connected to an E-block 24. Disk drive 10 also includes a rotary actuator assembly 40 rotationally mounted to the base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the read/write heads to the data tracks on the disks. The lines of the ILS connect at one end to the slider 29 and at the other end to an arm electronics (AE) module or chip 50 secured to a side of the E-block 24. The AE module 50 includes a read amplifier connected to the read head and a write driver connected to the write head. The AE module 50, which moves with movement of the E-block 24, is connected to the disk drive read/write channel electronics module or chip 70 via a flex cable 60. The channel electronics module 70 does not move but is fixed relative to the disk drive base 12 and is typically mounted to a printed circuit board fixed to the disk drive base 12.

Figure 2:
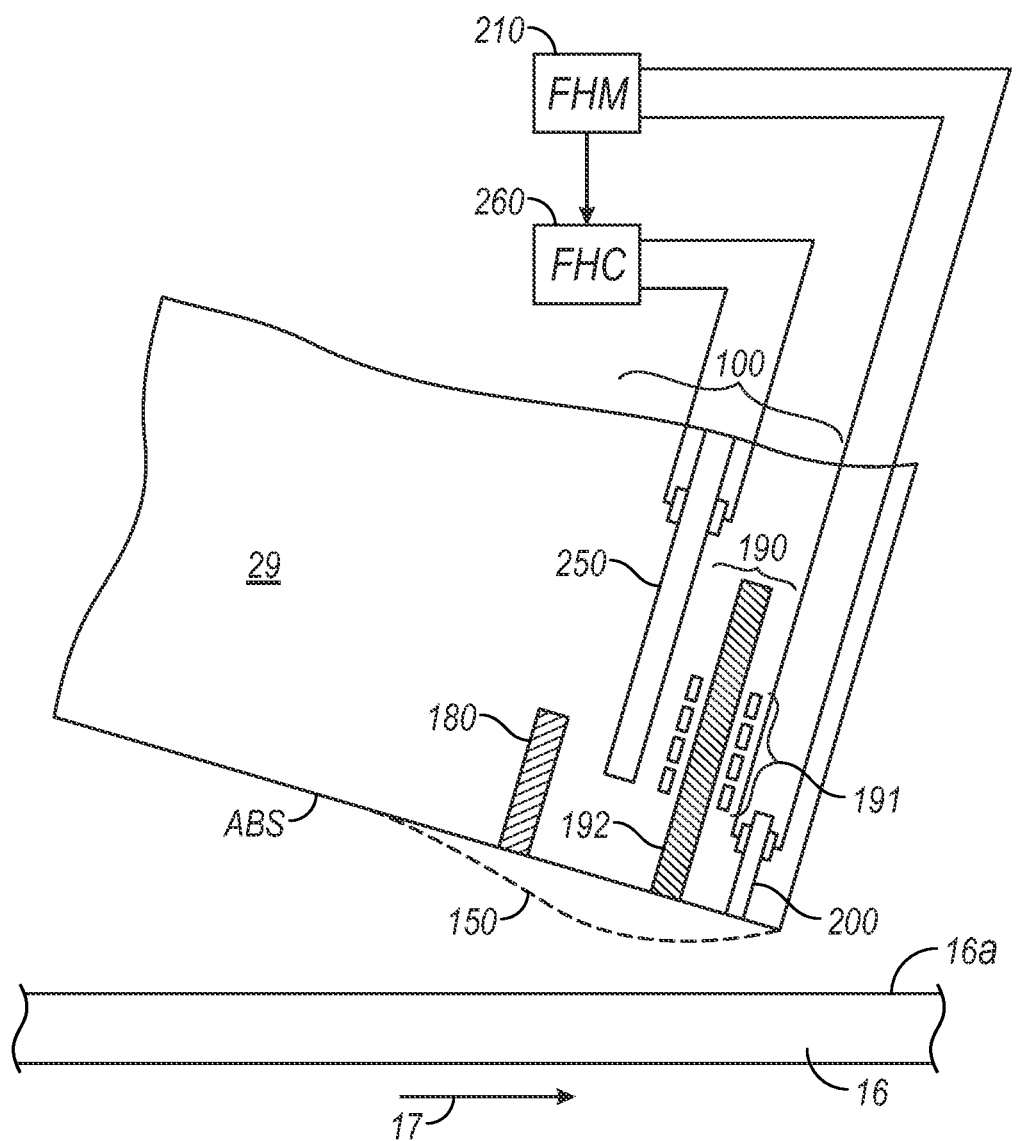
FIG. 2 is a sectional view of the end portion of an air-bearing slider above the surface of a disk and illustrates the fly-height sensor, the thermal fly-height actuator or heater, the read head and the write head.

FIG. 2 is a sectional view of the end portion of slider 29 above the surface 16a of disk 16 and shows read/write head 100. The read/write head 100 includes a MR read element or head 180 and a write element or head 190. Write head 190 is depicted as perpendicular magnetic recording inductive write head with coil 191 wrapped around write pole 192. The slider 29 also includes a fly-height sensor 200 for detecting the spacing between read/write head 100 and the surface 16a of disk 16, and a fly-height actuator 250 for changing the head-disk spacing. The fly-height sensor 200 is typically a resistor connected to a fly-height monitor (FHM) 210. As the resistor 200 gets closer to the disk surface 16a heat is dissipated to the disk 16 and the temperature of the resistor 200 decreases, which changes its resistance. The FHM 210 detects the change in resistance as a change in voltage or current, which provides a the head-disk spacing signal. This phenomenon is well-known and was first described in U.S. Pat. No. 5,455,730. The fly-height actuator 250 may be an electrically-resistive heating element or heater 250 connected to a fly-height controller (FHC) 260. As the current to heater 250 increases, the heater 250 expands and causes protrusion of the head 100, as shown by the dashed line 150, which moves the MR read head 180 and pole 192 of write head 190 closer to disk surface 16a. The FHC 260 controls the current to heater 250 in response to the head-disk spacing signal from FHM 210. A thermal fly-height actuator is described in U.S. Pat. Nos. 5,991,113 and 7,095,587 B2. U.S. Pat. No. 7,023,647 B2 describes a thermal actuator fly-height control circuit that may be implemented into the disk drive's MR head pre-amplifier circuit.

Figure 3:
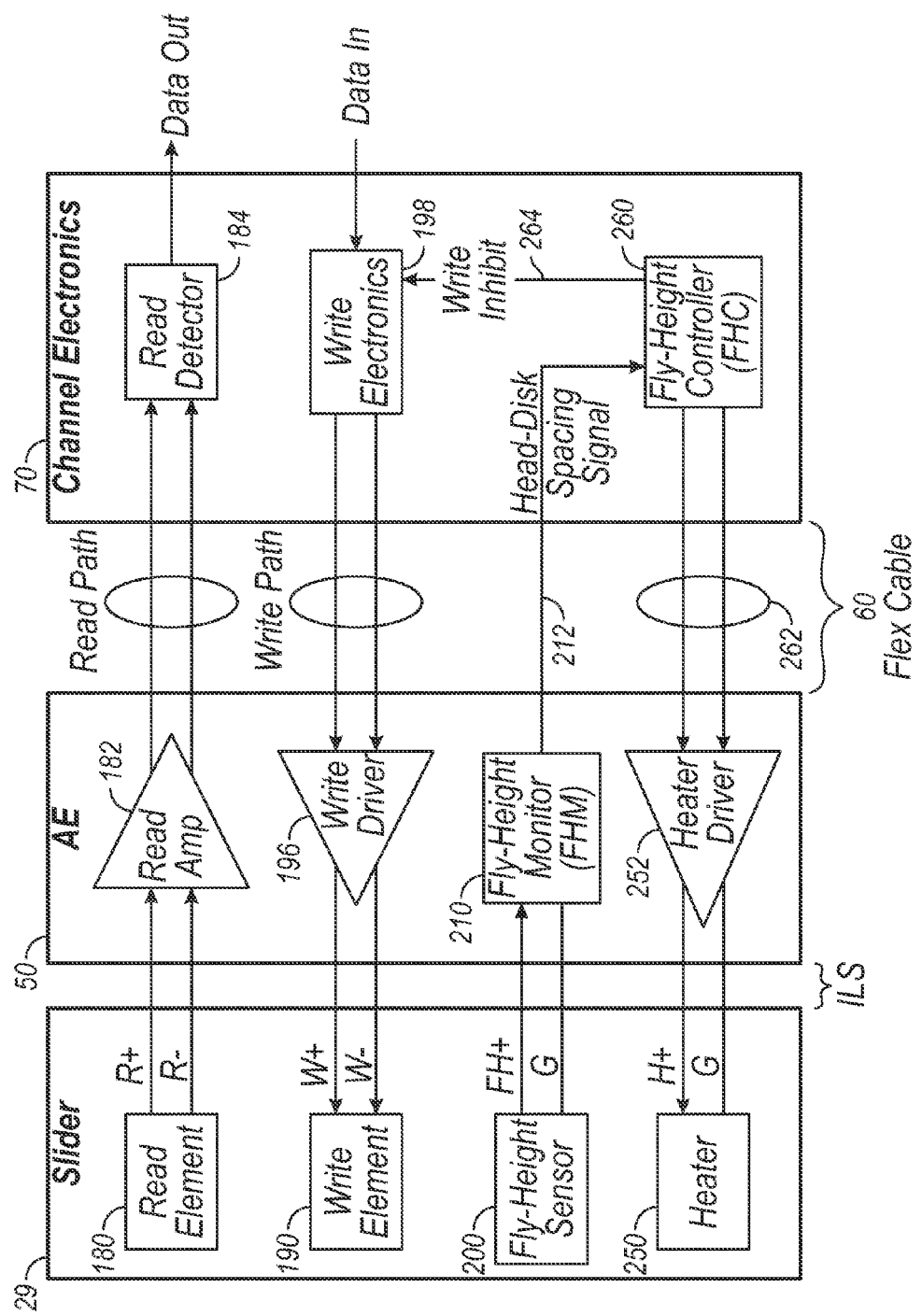
FIG. 3 is a block diagram showing the electrical connection between the slider, the arm electronics (AE) module and the channel electronics module according to the prior art.

FIG. 3 is a block diagram showing the electrical connection between the slider 29, the AE module 50 and the channel electronics module 70 according to the prior art. The connections between slider 29 and AE module 50 are via the ILS and include R+/R− connections between the read element 180 and the read amplifier 182, W+/W− connections between the write element 190 and the write driver 196, a fly-height (FH+) and ground (G) connections between the fly-height sensor 200 and the FHM 210, and heater (H+) and ground (G) connections between the heater 250 heater driver 252. The connections between AE module 50 and channel electronics module 70 are via a flex cable 60 and include the read path from the read amplifier 182 to the read detector 184, the write path from write electronics 198 to write driver 196, lead 212 from FHM 210 to FHC 260, and leads 262 from FHC 260 to heater driver 252. The FHC 260 may also provide an optional write inhibit signal on line 264 to write electronics 198. The write-inhibit signal may be activated when the head-disk spacing signal from FHM 210 detects a large voltage spike from fly-height sensor 200, indicating rapid heating of resistor 200 due to a head-disk contact, or when the output of FHM 210 indicates that the head is in near-contact with the disk. As shown in FIG. 3, a separate lead 212 is required on flex cable 60 between AE module 50 and channel electronics module 70, which also requires additional input/output (I/O) pins on these two modules.

Figure 4:
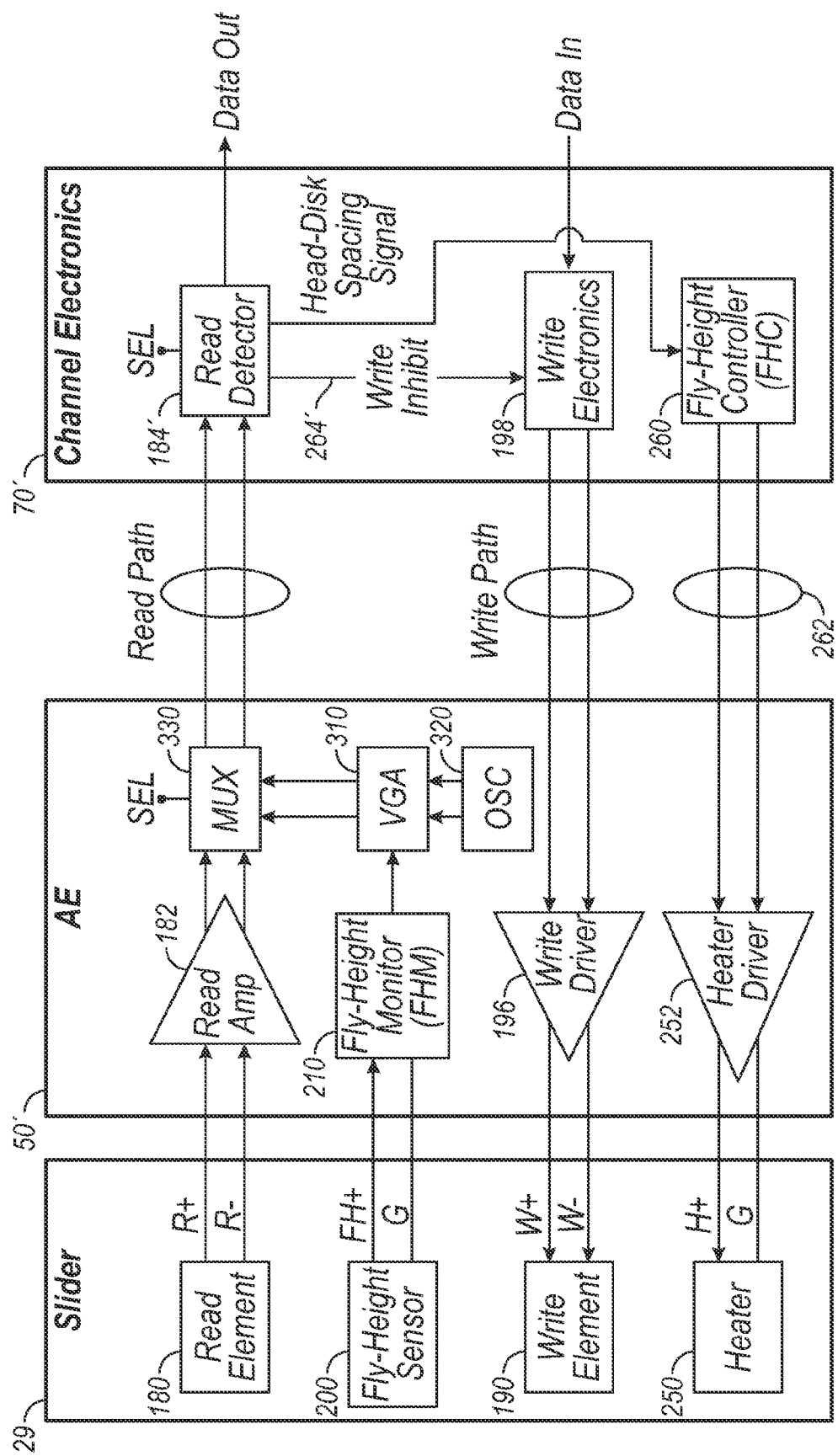
FIG. 4 is a block diagram of a first embodiment of the invention.

This invention provides a head-disk spacing signal back to the channel electronics module without the need for a separate lead on the flex cable and the associated increased number of I/O pins. The invention utilizes the existing read path and a multiplexer on the AE module to send the head-disk spacing signal during writing. FIG. 4 shows a first embodiment of the invention. The AE module 50' includes a variable gain amplifier (VGA) 310 that receives as one input the head-disk spacing signal from the FHM 210 and as the other input an emulated read signal from oscillator 320. The oscillatory signal from oscillator 320 preferably has a frequency close to that of the read signal from read amplifier 182. The output of the VGA 310 is thus an oscillatory signal that emulates the read signal but whose amplitude varies as the head-disk spacing varies. An analog multiplexer (MUX) 330 multiplexes the amplified read signal from read amplifier 182 with the VGA 310 oscillatory output signal on the read path back to read detector 184' in channel electronics module 70'. A digital select (SEL) switch enables the MUX 330 to select the read signal when the disk drive is in read mode and the VGA 310 oscillatory output signal when the disk drive is in write mode.

A digital select (SEL) switch enables the read detector 184' to process the read signal to generate the data out when the disk drive is in read mode and to process the VGA 310 oscillatory output signal when the disk drive is in write mode. The frequency of the oscillator 320 does not need to precisely match the frequency of the read signal but only has to emulate the read signal by being within the frequency range capable of detection and processing by read detector 184'. The read defector 184' outputs to FHC 260 a signal representative of the amplitude of VGA 310 oscillatory output signal, which represents the head-disk spacing signal. The read detector 184' can operate by taking advantage of the well-known Wallace spacing loss principle, wherein the read signal amplitude has an exponential relationship to the change in fly-height. Therefore in write-mode, the emulated read signal (i.e., the oscillatory VGA output signal with variable amplitude) can be made to be inversely proportionally to the fly-height or to have an exponential relationship to follow the Wallace spacing principle.

The read detector 184' (or alternatively the FHC 260) may also provide an optional write-inhibit signal on line 264' to write electronics 198. The write-inhibit signal may be activated when the read detector 184' detects that the amplitude of the VGA 310 oscillatory output signal indicates that the head is in contact or near-contact with the disk.

Figure 5:
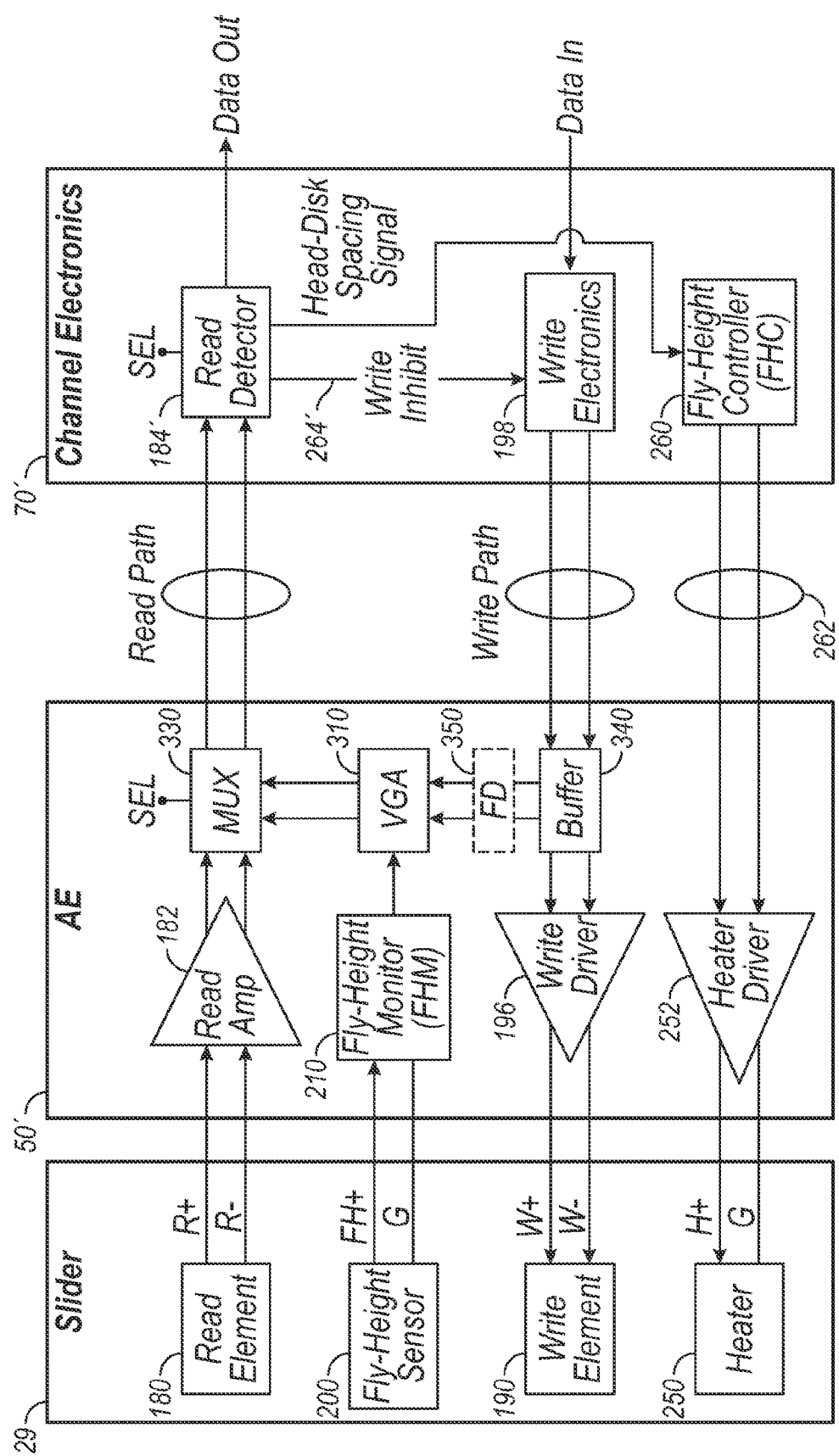
FIG. 5 is a block diagram of a second embodiment of the invention.

FIG. 5 shows a second embodiment of the invention. In this embodiment the write signal from the write electronics 198 is the source of the oscillatory input to VGA 310. A buffer block 340 functions as an isolating tap off of the write signal so there is no loading of the write signal to write driver 196. The write signal frequency may be reduced by an optional frequency divider (FD) 350 between buffer block 340 and VGA 310. The output of buffer block 340 is an oscillatory digital signal with a frequency in the range of approximately one-eighth to one-half of the system clock frequency. The write signal's frequency can be divided by frequency divider block FD 350 by a factor of two or four, which would depend on the preferred processing by the read detector block 184'. These frequencies are within the range capable of detection and processing by read detector 184'. Thus the buffer block 340 coupled to the write signal and the optional FD 350 function as circuitry that emulates the read signal, like the oscillator 320 in the first embodiment shown in FIG. 4.

The invention has been described with FHC 260 which enables the head-disk spacing to be actively controlled during writing. However, the invention is operable without active control by a FHC during writing, in which case only head-disk contacts or near-contacts are detected by read detector 184', so that writing can be inhibited.

While the invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
   a disk drive base;
   a rotatable magnetic recording disk mounted to the base and having a plurality of data tracks;
   an air-bearing slider maintained near the surface of the disk when the disk is rotating;
   a read/write head on the slider and including a read element for reading from the data tracks and a write element for writing to the data tracks;
   a fly-height sensor on the slider for generating a head-disk spacing signal;
   a head-positioning actuator for moving the slider and attached head to selected data tracks;
   an arm electronics (AE) module mounted to the actuator and electrically coupled to the read/write head and the fly-height sensor, the AE module including a read amplifier for amplifying the signal from the read element and a write driver for sending the write signal to the write element;
   a channel electronics module fixed relative to the base;
   a flex cable connecting the AE module to the channel electronics module and including read path leads for the amplified signal from the read amplifier to the channel electronics module and for the head-disk spacing signal to the channel electronics module and write path leads for the write signal from the channel electronics module to the write driver;
   wherein the AE module further comprises:
      a variable gain amplifier (VGA) coupled to the fly-height sensor for receipt of the head-disk spacing signal;
      read signal emulation circuitry for generating an oscillatory input signal to the VGA, the VGA generating an oscillatory output signal having an amplitude representative of the head-disk spacing; and
      a multiplexer for multiplexing the amplified read signal with the VGA oscillatory output signal on the read path leads; and
      a switch coupled to the multiplexer for selecting the amplified read signal to be transmitted on the read path leads during reading of data from the data tracks by the read element and for selecting the VGA oscillatory output signal to be transmitted on the read path leads during writing of data to the data tracks by the write element.

2. The disk drive of claim 1 wherein the read signal emulation circuitry comprises an oscillator.

3. The disk drive of claim 1 wherein the read signal emulation circuitry comprises a buffer block between the VGA and the write signal from the channel electronics module, whereby said oscillatory input signal has a frequency substantially the same as the frequency of the write signal.

4. The disk drive of claim 1 wherein the read signal emulation circuitry comprises a frequency divider between the VGA and the write signal from the channel electronics module, whereby said oscillatory input signal has a frequency related to and less than the frequency of the write signal.

5. The disk drive of claim 1 wherein the channel electronics module includes a read signal detector for detecting the amplified read signal from the multiplexer when the amplified read signal is on the read path leads and for detecting the amplitude of the VGA oscillatory output signal from the multiplexer when the VGA oscillatory output signal is on the read path leads.

6. The disk drive of claim 5 wherein the fly-height sensor generates a head-disk spacing signal indicative of head-disk contact and wherein the read signal detector comprises a write-inhibit signal generator responsive to the amplitude of the VGA oscillatory output signal corresponding to said head-disk contact.

7. The disk drive of claim 1 further comprising a fly-height actuator on the slider for changing the head-disk spacing and a fly-height controller for controlling the fly-height actuator in response to the amplitude of the VGA oscillatory output signal from the read detector.

8. The disk drive of claim 7 wherein the fly-height actuator is an electrically resistive heater.

9. The disk drive of claim 1 wherein the fly-height sensor comprises a resistor.

10. A magnetic recording disk drive comprising:
    a disk drive base;
    a rotatable magnetic recording disk mounted to the base and having a plurality of data tracks;
    an air-bearing slider maintained near the surface of the disk when the disk is rotating;
    a read/write head on the slider and including a read element for reading from the data tracks and a write element for writing to the data tracks;
    a fly-height sensor on the slider for generating a head-disk spacing signal;
    an electrically-resistive heater on the slider for changing the head-disk spacing;
    a head-positioning actuator for moving the slider and attached head to selected data tracks;
    an arm electronics (AE) module mounted to the actuator and electrically coupled to the read/write head, the fly-height sensor, and the heater, the AE module including a read amplifier for amplifying the signal from the read element and a write driver for sending the write signal to the write element;
    a channel electronics module fixed relative to the base;
    a flex cable connecting the AE module to the channel electronics module and including read path leads for the amplified signal from the read amplifier to the channel electronics module and for the head-disk spacing signal to the channel electronics module and write path leads for the write signal from the channel electronics module to the write driver; and
    wherein the AE module further comprises:
    a variable gain amplifier (VGA) coupled to the fly-height sensor for receipt of the head-disk spacing signal;
    read signal emulation circuitry for generating an oscillatory input signal to the VGA, the VGA generating an oscillatory output signal having an amplitude representative of the head-disk spacing; and
    a multiplexer for sending the amplified read signal on the read path leads during reading of data from the data tracks by the read element and for sending the VGA oscillatory output signal on the read path leads during writing of data to the data tracks by the write element; and wherein the channel electronics module further comprises:
a read signal detector for detecting the amplified read signal during reading and for detecting the amplitude of the VGA oscillatory output signal during writing, the read signal detector generating an output signal representative of head-disk spacing during writing; and
a fly-height controller coupled between the heater and the read signal detector and responsive to the read signal detector output signal during writing, the fly-height controller generating a control signal to the heater.

11. The disk drive of claim 10 wherein the read signal emulation circuitry comprises an oscillator.

12. The disk drive of claim 10 wherein the read signal emulation circuitry comprises a buffer block between the VGA and the write signal from the channel electronics module, whereby said oscillatory input signal has a frequency substantially the same as the frequency of the write signal.

13. The disk drive of claim 10 wherein the read signal emulation circuitry comprises a frequency divider between the VGA and the write signal from the channel electronics module, whereby said oscillatory input signal has a frequency related to and less than the frequency of the write signal.

14. The disk drive of claim 10 wherein the fly-height sensor generates a head-disk spacing signal indicative of head-disk contact and wherein the read signal detector comprises a write-inhibit signal generator responsive to the amplitude of the VGA oscillatory output signal corresponding to said head-disk contact.

15. The disk drive of claim 10 wherein the fly-height sensor comprises a resistor.

* * * * *